United States Patent [19]

Frankosky

[11] 4,395,455

[45] Jul. 26, 1983

[54] POLYESTER FIBERFILL BATTING HAVING IMPROVED THERMAL INSULATING PROPERTIES

[75] Inventor: Michael S. Frankosky, Wilmington, Del.

[73] Assignee: E. I. Du Pont de Nemours and Company, Wilmington, Del.

[21] Appl. No.: 343,499

[22] Filed: Jan. 28, 1982

[51] Int. Cl.³ .................. B32B 5/24; B32B 15/14; B32B 27/02

[52] U.S. Cl. .................................. 428/299; 2/272; 428/285; 428/287; 428/298; 428/332; 428/398; 428/458; 428/920

[58] Field of Search ............... 428/285, 287, 332, 458, 428/920, 340, 398, 299, 298; 2/272

[56] References Cited

U.S. PATENT DOCUMENTS 3,009,601 11/1961 Matsch .
3,145,515 8/1964 Clapsadle .
3,265,236 8/1966 Gibbon et al. .
4,118,531 10/1978 Hauser .
4,230,057 10/1980 Kurz .

OTHER PUBLICATIONS

"Textiles As Protection Against Extreme Wintry Weather," by C. Cooper, Stores and Clothing Res. & Dev. Establishment, Ministry of Defense, U.K., 1979, London pp. 72, 76 and 77.
PL-182TT Thinsulate ® Thermal Insulation, 3M Company, May 1, 1978.
Technical Report 69-74-CE, U.S. Army Natick Labs, Series TS-162, Jun. 1969, p. 192.
CPAI 1979 Textile Technology Forum, Toronto, Nov. 16, 1979, Presentation by Cooper and Frankosky.

Primary Examiner—Paul J. Thibodeau

[57] ABSTRACT

A plurality of layers of high-loft polyester fiberfill batting separated by sheets of metal foil or metalized polymeric film results in an unexpected increase in thermal insulating properties based on weight which can provide thermal insulation equivalent to natural down.

2 Claims, No Drawings

POLYESTER FIBERFILL BATTING HAVING IMPROVED THERMAL INSULATING PROPERTIES

DESCRIPTION

1. Technical Field

This invention concerns improvements in the thermal insulating properties of high-loft polyester fiberfill battings, and more particularly such battings which are particularly suited for use in thermally insulated articles such as garments, quilts and sleeping bags having a light weight.

2. Background Art

Thermally insulated articles prepared from synthetic crimped fibers, for example of the hollow fiber type described in U.S. Pat. No. 3,772,137, or from more compact layered structures consisting of metalized films separated by a knitted nylon mesh, as described in U.S. Pat. No. 4,230,057, are known which can provide very effective thermal protection. However, on the basis of comfort-per-unit-weight articles prepared from synthetic insulating materials have as yet not been able to compete fully with articles insulated with natural goose down because of less efficient insulating qualities. Consequently, in applications where lightness of weight is at a premium, such as in garments or in sleeping bags for use by military forces in the Arctic, natural down remains as a preferred insulating material.

DISCLOSURE OF THE INVENTION

An object of this invention is a lightweight polyester fiberfill insulating material having improved thermal insulating properties equivalent to natural down on a unit weight basis. The trade commonly considers "down" on a weight basis to have about a 15% advantage in thermal insulating properties versus polyester fiberfill.

This invention employs a thermal insulating material comprised of layers of polyester fiberfill batting having a density of less than 1.0 lb./ft.$^3$ (0.016 g./cm.$^3$), i.e., high-loft, sandwiched between thin flexible sheets of heat-reflective metal foil or metalized polymeric film. Each layer of fiberfill desirably has a density within the range of about 0.35 to 0.60 lb./ft.$^3$ (0.0056 to 0.0096 g./cm.$^3$) and a thickness within the range of about 0.25 to 0.6 in. (0.64 to 1.52 cm.) thick. Unexpectedly greater thermal efficiency is provided by such a multilayered structure. In the structure, adjacent layers of fiberfill are separated from one another by a sheet of the foil or the film, and vice versa. Insulating properties at least equivalent to those of natural down can be provided by such a structure having for example five layers of a high-loft batting separated by four sheets of the foil or the film. Preferably metalized film is used where toughness and durability to stress and flexing are important.

Thus one ebodiment of the invention is an improved insulating material for use in insulated textile articles which material consists essentially of a plurality of, preferably at least five, substantially parallel layers of high-loft polyester fiberfill with adjacent layers being separated from one another by a thin flexible sheet of metal foil or metalized polymeric film with the layered structure having an average density within the range of from about 0.35 to about 0.6 lb./ft.$^3$ (0.0056 to 0.0096 g/cm.$^3$) and the thickness of each fiberfill layer is within the range of about 0.25 to 0.6 in. (0.64 to 1.52 cm.) so that compared to an all fiber sample of the same weight and density (i.e., replacing the film layers with an equal weight of the same density fiberfill) the increase in CLO units due to the separating sheets corresponds to an increase of at least 15 percent.

The insulating material of this invention can be used in the conventional manner of known fiberfill battings for the manufacture of insulated textile articles such as outer garments, quilts, sleeping bags and the like. The layers may be held in place by conventional stitching (sewing) methods commonly employed in the trade. Of course, at points where the stitches are located, the material will be compressed somewhat but between stitches the material remains in a high-loft condition as claimed herein.

Whereas the preferred use for insulating materials of this invention is in combination with textile coverings, it can also be used in the construction of rigid articles such as insulated containers, where it can be used advantageously when lightweight rather than low volume is more important.

Polyester fiberfill particularly effective for this invention consists essentially of high-loft, hollow, crimped fibers of poly(ethylene terephthalate), for example of the type described in U.S. Pat. No. 3,772,137 and as used therein to make pillow batts. Suitable fiberfill consists essentially of intermingled hollow fibers of 4 to 6 denier crimped in a saw-toothed configuration to impart a crimp frequency within the range of 5 to 12 crimps/in. (2.0 to 4.7 crimps/cm.) and a crimp index within the range of 25% to 35%. The fibers are characterized by a substantially central continuous longitudinal void which extends throughout the length of the fiber and which comprises from 8 to 30 percent, preferably 13 to 25 percent, of the fiber volume. These parameters are measured as described in U.S. Pat. No. 3,772,137, the entire disclosure of which is incorporated herein by way of reference.

The range of fiberfill denier per filament from 4 to 6 is found to be particularly advantageous with respect to providing the high-loft, i.e., high bulk at low density. Otherwise stated, such fibers have been found to provide superior bulk at equivalent weight with respect to fibers of other deniers.

With the high-loft fiberfill, versus more dense fiberfill, the use of reflective films has been found to provide a surprising improvement in thermal insulating qualities, while maintaining a low weight per unit area. When such films are used in combination with denser layers of fibrous insulating materials, for example, fiberfill having a density of 1.0 lb./ft.$^3$ (0.016 g./cm.$^3$) or more, as obtained by needle punching or by placing the fiberfill under compression, the combination is not as effective as in the invention.

Heat-reflective films useful in this invention include thin metal foil, such as common household aluminum foil. For greater durability the sheets are preferably comprised of metalized polymeric films such as aluminized biaxially-oriented polyester film, but other polymeric films such as polyethylene or polypropylene having on at least one side a heat-reflective metalized coating can also be used. Some such metalized films are taught in U.S. Pat. No. 4,230,057. The film should be as thin as possible to minimize weight while yet being sufficiently strong to meet end-use requirements. The film's primary function is suspected to be one of reflection of heat.

The layered insulating material of this invention may be used in combination with other textile or nontextile insulating materials to provide the desired degree of comfort and performance in the finished article.

To facilitate vapor permeability, or breathing of the material as for wearing apparel, the films may be perforated at spaced intervals as is known in the art.

EXAMPLE

This example demonstrates the greater effectiveness of spaced sheets of a heat-reflective foil or film when used in combination with high-loft polyester battings as compared to the use of clear films or with denser battings.

(A) A quantity of batting is prepared by carding in a conventional manner fibers of poly(ethylene terephthalate) fiberfill having a denier per fiber of 5.5, a saw-toothed stuffer box crimp, a crimp frequency of 5–8 crimps/in., a crimp index of about 15–20% and a round cross section with a central void running throughout the length of the fibers which is substantially free of collapse and which provides an average percent void of about 15%. Five 12 inch by 12 inch (30.5 by 30.5 cm.) pads are cut from the batting which has a weight per unit area of 2.7 oz./yd.$^2$ (91.5 gm./m.$^2$). In aggregate the five pads weigh 1.5 oz. (42.5 gm.) and when stacked together are equivalent to a 13.5 oz./yd.$^2$ (458 gm./m.$^2$) batting. An 11.5 inch by 11.5 inch sheet of 0.0005 inch (0.013 mm.) thick aluminized biaxially oriented polyester film ("Mylar" polyester film, a registered trademark of E. I. du Pont de Nemours and Company, Wilmington, Del.) is placed between each layer of batting giving a composite structure consisting of five layers of batting separated by four layers of film. The layered structure is 2.62 inches (6.65 cm.) thick and has an average density of 0.43 lb./ft.$^3$ (0.0069 gm./cm.$^3$). The thermal resistance of this layered structure is found to be 8.99 CLO units when measured in the conventional way on a Dynateck Rapid-k thermal conductivity apparatus.

As a control test, when the sheets are instead placed all together (i.e., adjacent to one another) either immediately above or immediately below the five layers of batting in the test apparatus, the CLO value is found to be only 6.45 and 6.59 units respectively. This increase in CLO units for the multilayered structure of the invention is clearly attributable to the spaced positioning of the sheets.

The average increase in CLO units with the spaced separating sheets of 2.47 (based on an average value for the two control items of 6.52) corresponds to an increase in insulating properties of about 38 percent. Compared to the theoretical performance of an all fiber sample of the same weight (i.e., replacing the film with an equal weight of fiberfill) the increase in performance is about 20 percent above that obtainable from the all fiber sample. In practical terms this 20 percent increase in performance theoretically overcomes the difference in performance commonly associated between natural down and polyester fiberfill in the trade.

A similar experiment is run using clear polyester film in place of the metalized film. The difference in CLO units for the layered structure as compared to the average control is only 0.57 units. This corresponds to only about a 9 percent (vs. 38%, above) improvement for the layered structure.

A third experiment is run wherein sheets of aluminum foil are used in place of the metalized film. The increase in thermal resistance as measured by CLO units for the layered structure is about 2.4 units, again showing the importance of spacing of the heat-reflective foil.

(B) The above three experiments are repeated except that in each case the thickness of the structure is compressed from 2.62 in. (6.65 cm.) to 1.13 in. (2.87 cm.) which in effect doubles the density of the structure to about 0.86 lb./ft.$^3$ (0.0138 gm./cm.$^3$). The data contained in the following table show that not only is the insulating quality of the structure very significantly reduced, but the relative improvement realized by the use of the spaced reflective films is much less than that realized in the first series of experiments (A). For instance, the improvement in CLO units as measured with the separated metalized film in this case is only about 20 percent compared to more than 35 percent in (A) above.

(C) Another series of experiments is run in a similar manner except that in place of the above batting is used five layers of commercial "Sontique" batting, which is made from a mixture of 1.65 denier per filament non-hollow poly(ethylene terephthalate) fibers, ⅓ of which are surface treated with a polysiloxane slickener, bonded together at crossover points with lower melting polyester binder fibers. The structure has a thickness of 2.13 in. (5.4 cm.) and a weight per unit area of 32.7 oz./yd.$^2$ (1109 gm./m.$^2$). This corresponds to a density of about 1.3 lb./ft.$^3$ (0.021 gm./cm.$^3$) and from the data in the following table it is seen that whereas the structure provides a high CLO value the overall improvement from the use of reflective film in spaced layers versus together or versus clear films is again considerably less than that realized with the high-loft items of (A) above.

TABLE 1

EFFECT OF VARIOUS BARRIERS ON THE THERMAL RESISTANCE OF POLYESTER FIBER BATTING

| Separator: How Placed | Aluminum Foil | Clear Film | Metalized Film |
|---|---|---|---|
| A. Batting: 5.5 dpf fiberfill ("Hollofil" 808),* 2.62 inches, 13.5 oz/yd$^2$ | | | |
| Spaced | 9.32 | 6.89 | 8.99 |
| Below | 7.02 | 6.40 | 6.45 |
| Above | 6.90 | 6.24 | 6.59 |
| B. Batting: 5.5 dpf fiberfill ("Hollofil" 808), 1.13 inches, 13.5 oz/yd$^2$ | | | |
| Spaced | 5.29 | 4.28 | 4.96 |
| Below | 4.34 | 4.05 | 4.07 |
| Above | 4.21 | 4.14 | 4.09 |
| C. Batting: 1.65 dpf fibrous batting ("Sontique")** 2.13 inches, 32.7 oz/yd$^2$ | | | |
| Spaced | 9.62 | 9.00 | 9.86 |
| Above | 9.01 | 8.92 | 8.93 |

*Registered trademark of E. I. du Pont de Nemours and Company.
**Certification mark of E. I. du Pont de Nemours and Company.

This improvement in thermal resistance of high-loft fiberfill battings in combination with spaced heat-reflective foils or films can be used to provide lightweight insulated garments and articles which are more competitive on a weight basis with corresponding articles insulated with natural down while retaining polyester fiberfill's natural resistance to thermal losses on becoming damp or wet.

I claim:

1. An improved insulating material for use in thermally insulated textile articles which material consists essentially of a plurality of substantially parallel layers of high-loft polyester fiberfill consisting essentially of intermingled hollow fibers having a denier per fiber of 4 to 6 and a void content of from 8 to 30 percent with adjacent layers being separated from one another by a thin flexible sheet of metal foil or metalized polymeric film with the layered structure having an average density within the range of from about 0.35 to about 0.6 lb./ft.$^3$ and the thickness of each fiberfill layer is within the range of about 0.25 to 0.6 in. so that compared to an all fiber sample of the same weight and density the increase in CLO units due to the separating sheets corresponds to an increase of at least 15 percent.

2. An insulating material of claim 1 wherein said plurality of fiberfill layers is at least five.

* * * * *